United States Patent [19]
Riley

[11] Patent Number: 5,572,962
[45] Date of Patent: Nov. 12, 1996

[54] VARIABLE VALVE LIFT MECHANISM FOR INTERNAL COMBUSTION ENGINE

[75] Inventor: Michael B. Riley, Fort Collins, Colo.

[73] Assignee: Motive Holdings Limited, Bouvet Island

[21] Appl. No.: 344,826

[22] Filed: Nov. 23, 1994

Related U.S. Application Data

[63] Continuation-in-part of Ser. No. 246,274, May 19, 1994, Pat. No. 5,456,224, which is a continuation-in-part of Ser. No. 122,223, Sep. 15, 1993, Pat. No. 5,365,895, which is a continuation-in-part of Ser. No. 800,920, Dec. 3, 1991, Pat. No. 5,341,771.

[51] Int. Cl.⁶ .................................................... F01L 13/00
[52] U.S. Cl. ..................................... 123/90.16; 123/90.41
[58] Field of Search ............................ 123/90.15, 90.16, 123/90.39, 90.41, 90.44

[56] References Cited

U.S. PATENT DOCUMENTS

| 4,721,007 | 1/1988 | Entzminger | 123/90.16 |
| 4,883,026 | 11/1989 | Mansfield et al. | 123/90.16 |
| 5,365,895 | 11/1994 | Riley | 123/90.16 |

*Primary Examiner*—Weilun Lo
*Attorney, Agent, or Firm*—Davis, Graham & Stubbs LLP

[57] ABSTRACT

Valve lift and duration may be varied by moving the pivot of a rocker arm or finger follower, and simultaneously altering the valve clearance during engine operation. The phase of the valve event may also be varied by moving the rocker arm lengthwise at the same time that the pivot is moved. This is accomplished by using a different diameter for the toothed cog tracking across a stationary rack as for the toothed cog that engages the rocker arm or finger follower. Controlled variation of lift, duration and phase may be achieve solely with a moving pivot.

12 Claims, 6 Drawing Sheets

VARIABLE VALVE LIFT MECHANISM FOR INTERNAL COMBUSTION ENGINE

This application is a continuation-in-part of applications Ser. No. 08/246,274, filed on May 19, 1994, now U.S. Pat. No. 5,456,224, which is a continuation-in-part of Ser. No. 08/122,223, filed on Sep. 15, 1993, now U.S. Pat. No. 5,365,895, which is a continuation-in-part of Ser. No. 07/800,920, filed on Dec. 3, 1991, now U.S. Pat. No. 5,341,771.

FIELD OF THE INVENTION

The present invention relates to an internal combustion engine using puppet type valves to direct gases into and out of one or more cylinders. The degree of lift of the valves, particularly the intake valve, may be altered, along with the duration the valve is open, and the phase with which the valve is opened, to optimize engine torque at different engine speeds, as well as to improve idle stability and fuel efficiency.

BACKGROUND OF THE INVENTION

A description of the benefits of variable valve actuation is given in application Ser. No. 08/246,274. Optimal operation of valves requires suitable variation of lift, duration and phase. In that patent application both variable lift and duration are described with the mechanism that moves the pivot of a rocker arm.

Variation of phase has been accomplished in a number of different ways. One of the simplest methods to comprehend is to alter the phase between the crankshaft and the intake camshaft in a dual overhead camshaft layout. This may occur with a drive mechanism than incorporates splines on the camshaft and a driving drum, as shown in SAE paper 901727. During operation the driving drum and camshaft are moved relative to each other while the cam drive undergoes normal operation.

A more complicated means of achieving phase variation is to use a three dimensional cam that is moved axially. This type of system, as described in U.S. Pat. Nos. 3,618,574 by Miller and 5,080,055 by Komatsu, et al., can be used to vary lift, duration and phase in a variety of ways.

Another simple method to control phase is that of switching between two independent cam profiles for low and high speed operation. Examples of this approach are described in U.S. Pat. Nos. 2,934,0452 by Longenecker, 4,151,817 by Mueller, 4,205,634 by Tourtelot, 4,970,997 by Inoue, et al. and 5,113,813 by Rosa. In this case, phase may be altered in a step-wise fashion from one angle to a second angle. Such a mechanism also allows the possibility of a step variation of lift and duration.

SUMMARY OF THE INVENTION

The present invention extends the system for dynamically altering the lift and duration of a poppet valve in an internal combustion engine, as described in earlier applications, to include variable phase.

Variations in phase may be achieved by displacing the rocker arm or finger follower by small amounts in a lengthwise direction. As the pivot shaft moves from one position to another, the rocker arm or finger follower will move either a smaller or a larger distance, depending on the changes desired. The invention accomplishes variable lift, duration and phase with a moveable pivot while meeting the operating requirements given in an earlier application.

Variation of phase of the valve occurs with the rocker arm or cam follower being moved lengthwise from one operating condition to another, so that the contact line between the cam and the cam follower occurs at a different crankshaft angle for a particular cam angle, under the two different operating conditions. This is easily achieved by having the radius of the pivot shaft teeth that contact the rocker arm different from the radius of the pivot shaft teeth that contact the stationary rack. Lengthwise movement of the rocker arm or finger follower requires that the tappet end of the rocker arm have a suitable member to translate the forces to the valve.

BRIEF DESCRIPTION OF THE DRAWINGS

FIG. 5b shows another profile view, similar to FIG. 5a, but with the toothed cogs moved to provide much reduced lift. The rocker arm has moved to the right, and makes contact on the cam at a different cam angle for the same crankshaft angle as in FIG. 5a.

DETAILED DESCRIPTION OF THE INVENTION

Figure 1:
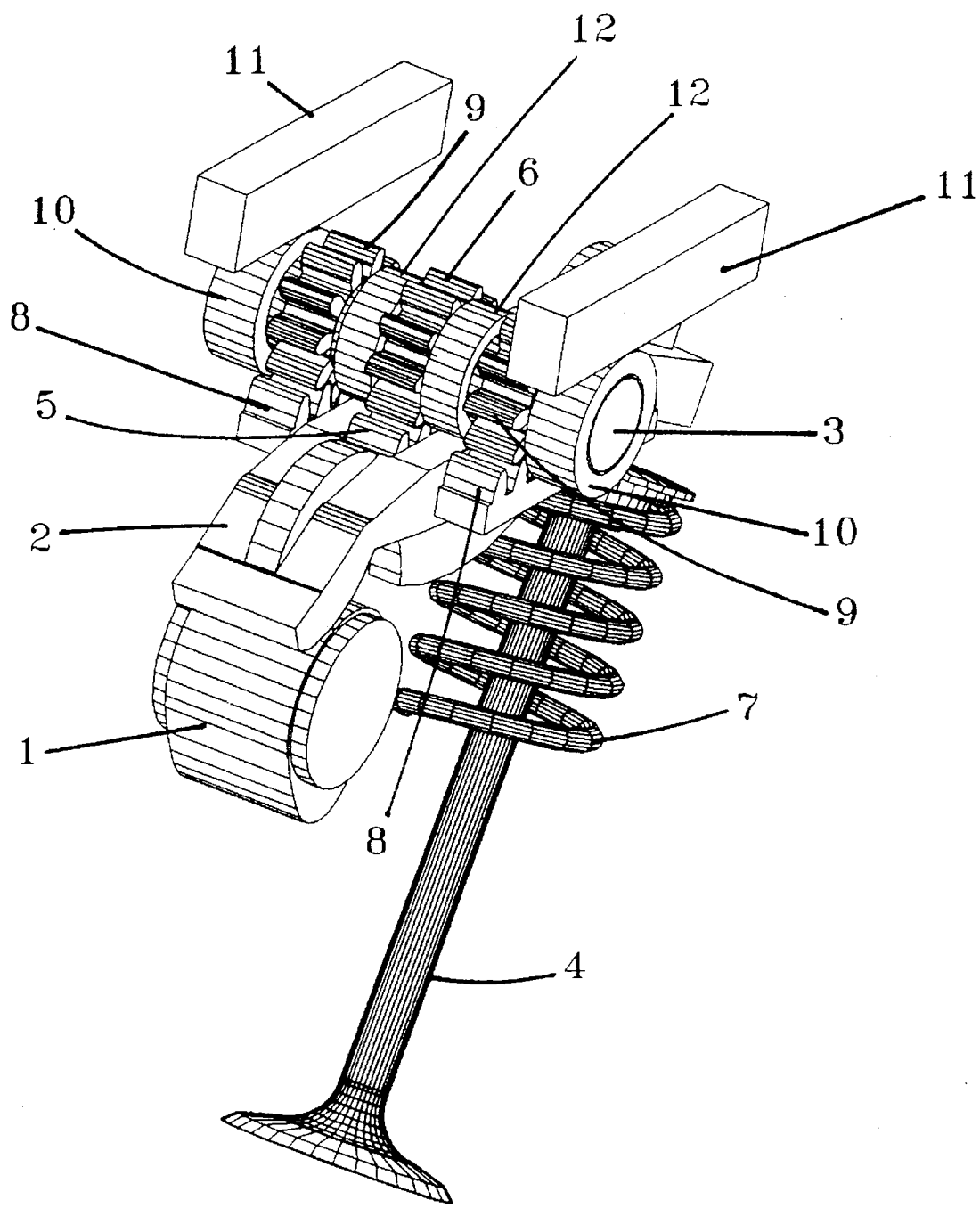
FIG. 1 shows a schematic assembly of one embodiment of the variable lift and duration mechanism with no phase shift.
Figure 2:
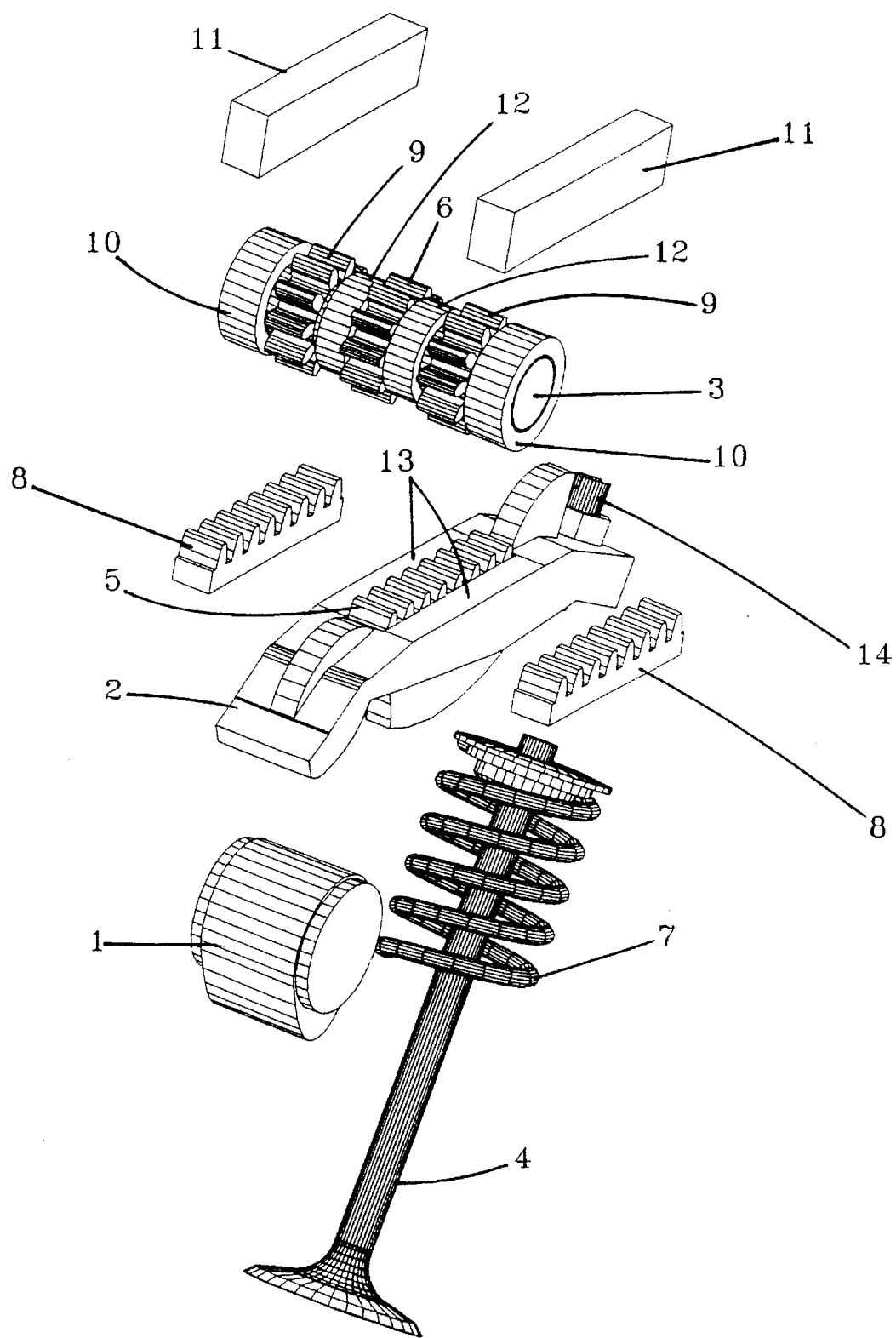
FIG. 2 shows the same assembly as FIG. 1 but exploded for a better view of the components.

One embodiment of the invention is shown in FIGS. 1 and 2. FIG. 1 shows the mechanism assembled, and FIG. 2 shows the embodiment in exploded format. Cam 1 rocks rocker arm 2 against pivot shaft 3 to open valve 4. When cam 1 has its base circle presented to rocker arm 2, toothed rack 5 on the upper surface of said rocker arm is held in mesh with the teeth of toothed pivot cog 6 on pivot shaft 3 by a light spring (not shown). When cam 1 lifts its end of rocker arm 2 to rock said rocker arm, the resistive force of the valve spring 7 associated with valve 4 ensures contact between the toothed rack 5 and the toothed pivot cog 6. Stationary rack 8 is shown as having the same straight line shape and tooth pitch as toothed rack 5 on the upper surface of rocker arm 2. Toothed cog 9 on pivot shaft 3 has the same diameter and tooth pitch as toothed cog 6 in FIG. 1. When pivot shaft 3 is located at any one particular position it is prevented from rotating by stationary rack 8. When pivot shaft 3 is moved from one position to another, the equal pitches and diameters of toothed cogs 6 and 9, and toothed racks 5 and 8 in FIG. 1 ensure that the rocker arm does not move parallel to its length. Bearings 10 allow pivot shaft 3 to roll over the lower surfaces of caps 11, which not only constrain the upward force of the cam and valve, but provide appropriate clearance variation, if desired, between maximum and minimum lift. The shape of the underside of caps 11 is shown as straight here, although it may be curved. The annular, non-toothed surfaces 12 on pivot shaft 3 ride on flat surfaces 13 of rocker arm 2 (see FIG. 2) in this case. Surfaces 13 may be curved also.

Although not shown in FIGS. 1 or 2, it is possible that toothed rack 5 may float in rocker arm 2 the same way that stationary rack 8 may float. Either or both springs or hydraulic pressure may be used to urge the toothed racks upwards.

Figure 3:
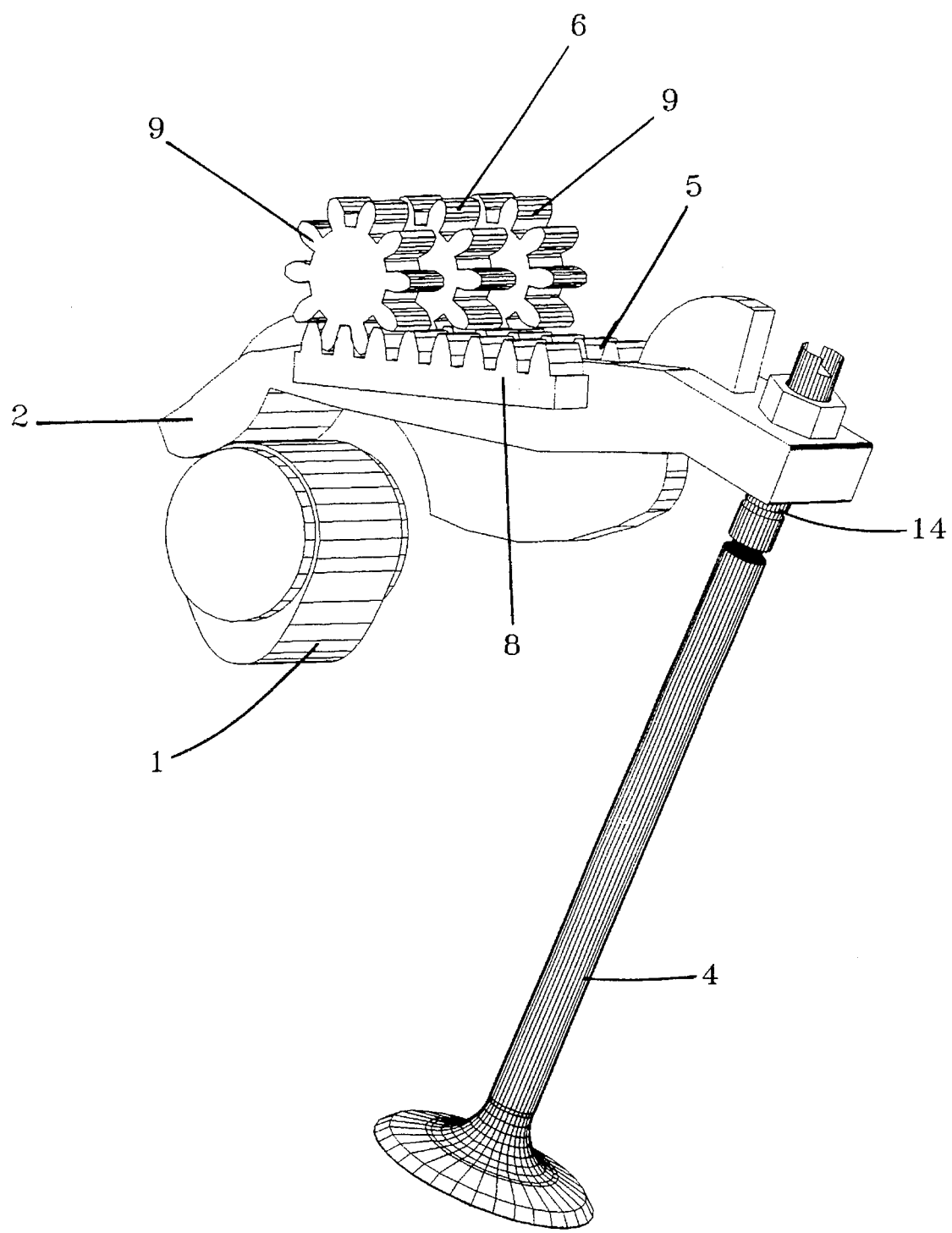
FIG. 3 shows a schematic of the rocker arm and two toothed cogs of the same diameter, resulting in no phase change as valve lift varies.
Figure 4:
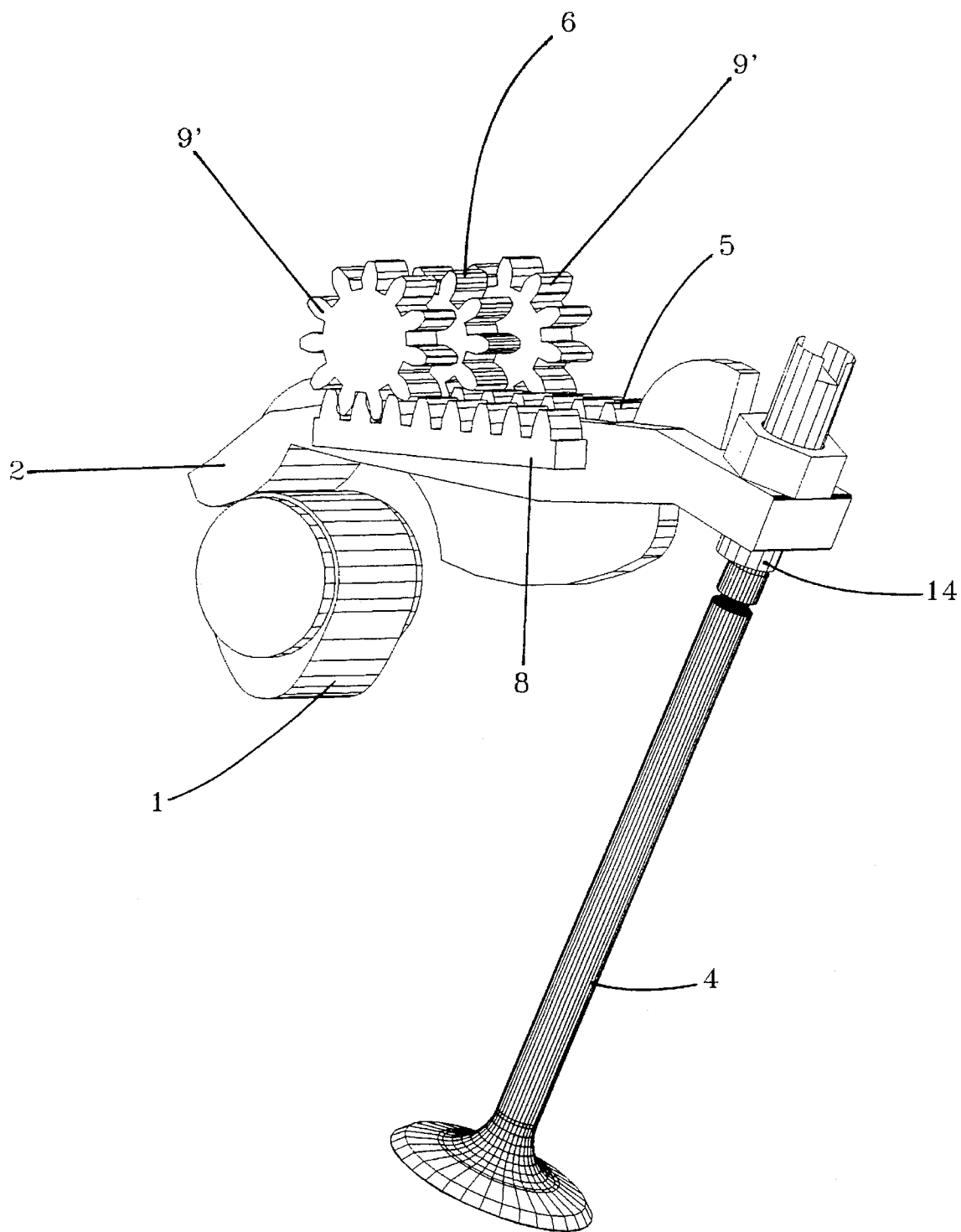
FIG. 4 shows the same schematic idea as FIG. 3, but the two toothed cogs are of a different diameter, and the stationary rack is lowered. In this case there is phase shift variation with valve lift. The tappet is enlarged to achieve suitable actuation of the valve in allowing for lengthwise movement of the rocker arm.

In FIGS. 3 and 4 many components have been removed to highlight the effects of altering the diameters of the cogs 6 and 9 on pivot shaft 3.

FIG. 3 shows toothed cogs 6 and 9 to be the same diameter. Toothed rack 8 is at the same height as toothed rack 5 on rocker arm 2. As pivot shaft 3 is moved from the maximum lift case shown to a reduced lift, toothed cogs 6 and 9 traverse toothed racks 5 and 8 in unison, with no change in phase.

FIG. 4 shows toothed cogs 6 and 9' to be of different diameters. In this case toothed cog 9' has one more tooth than cog 9 in FIG. 3, and to keep the same tooth profile, the diameter of cog 9' is greater than cog 9. Toothed rack 8 is lower in height compared to FIG. 3, to allow for the altered distance from the centerline of pivot shaft 3 due to the greater diameter of toothed cog 9'. As pivot shaft 3 is translated and rotated across stationary toothed rack 8, rocker arm 3 will be moved lengthwise. The purpose is to move the contact point of cam 1 with rocker arm 2 in a controllable fashion to alter the phase of the valve event. The comparative diameters of toothed cogs 6 and 9 will depend on the direction of rotation of cam 1 and also the strategy with which the phase is to be altered. With toothed cog 9' being concentric on pivot shaft 3, phase will be altered linearly from one extreme of position of pivot shaft 3 to the other extreme. Toothed cog 9' may be mounted eccentrically on pivot shaft 3, with an appropriately altered shape to the control paths 11, to alter the phase in a non-linear manner. In either case, the size of the tappet 14 will be greater than one in which the phase is not so altered. The geometry of tappet 14 may be different from that shown, but the purpose is to allow the force transmitted through rocker arm 2 to actuate valve 4.

FIG. 4 shows the rocker arm 2 and toothed cogs 6 and 9' at maximum cam lift, and greatest amplification of the cam lift. This geometry is suitable for high speed operation, where the phase of maximum valve lift will occur later than at lower engine speeds. Tappet 14 is slightly offset from the top of valve 4.

Figure 5A:
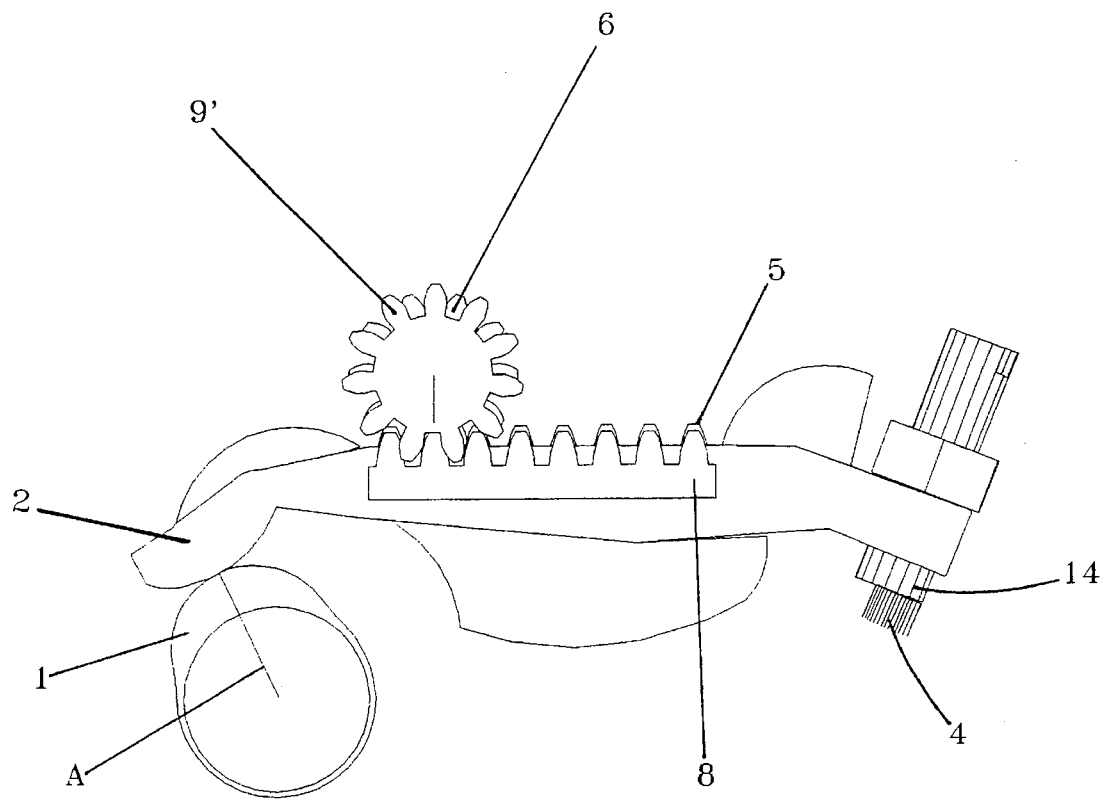
FIG. 5a shows a profile view of the rocker arm with the different diameter toothed cogs from FIG. 4. The two cogs are in the position to provide maximum valve lift.

FIG. 5a shows the contact angle of cam 1 and rocker arm 2 at maximum valve lift. Toothed racks 5 and 8 are aligned at their left ends. Tappet 14 is offset so that it is not squarely over the top of valve 4. Line A shows peak lift of cam 1, and it is in contact with rocker arm 2 here.

Figure 5B:
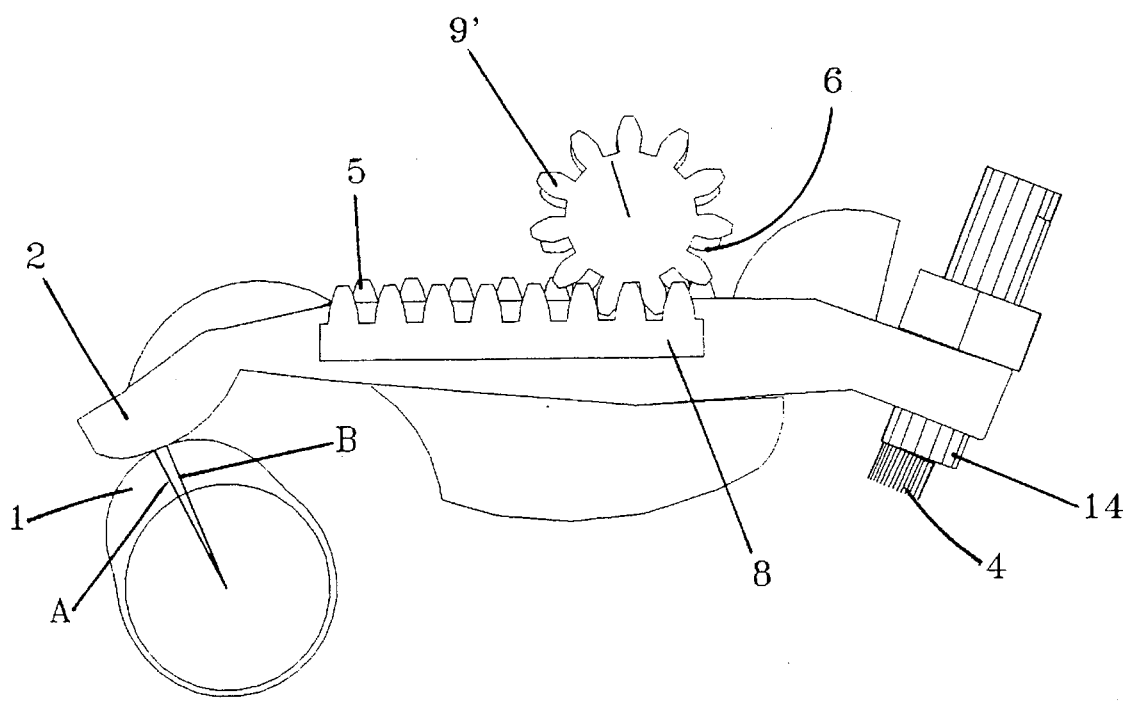

FIG. 5b shows the change in contact angle as pivot shaft 3 is moved to the right and towards minimum valve lift. Line B on cam 1 is now in contact with rocker arm 2. The variation in crankshaft angle between lines A and B on cam 1 is approximately 10° for this particular case. Toothed rack 8 and valve 4 have stayed in their original positions, and rocker arm 2 has moved to the right, due to the difference in diameters of toothed cogs 6 and 9'. Valve 4 is now acted upon by tappet 14 on the opposite side to the maximum lift case shown in FIG. 5a. Different diameters for toothed cogs 6 and 9' will yield greater or smaller angular variations. Usually the lower lift case would correspond to lower engine speeds, with shorter duration and the phase angle at maximum cam lift would be retarded from the high speed, high lift case, where valve duration would be longer.

The angle between the line from the pivot point defined by the contact of bearing surfaces 12 and 13 to the top of valve 4 and the axis of valve 4 should not vary too greatly from maximum to minimum lift. As lift is reduced however, this becomes less of a design problem. (Valve deactivation may occur with further movement of the pivot towards the valve, although phase is then irrelevant. Similarly, the angle between the pivot point of pivot shaft 3 and rocker arm 2 to the contact point of the tappet 14 and valve 4, and the axis of valve 4, is not important for valve deactivation. This results in a greater cross sectional area of the rocker arm that may be reinforced to provide suitable structural stiffness.)

The relationship between lift, duration and phase is fixed once an appropriate strategy has been selected. A wide range of strategies is possible, with the simplicity of only one moving part being required to allow the interrelated variation in all three.

Variation in lift, duration and phase is also possible with finger follower geometries, but due to the nature of the pivot the variations are not as large as for rocker arm geometries.

What is claimed is:

1. A method for operating an internal combustion engine having a combustion volume with at least one valve, the valve being operable to a predetermined extent by a rocker arm, the rocker arm having one end engaged with the valve to control the extent of the valve opening and the rocker arm having an opposite end responsive to a cam on a rotating camshaft to control the phase of the valve opening, the rocker arm being pivotable on a pivot shaft, the method comprising: rolling the pivot shaft along a pivot shaft bearing surface to adjust the position of the pivot shaft in relation to the rocker arm to vary the extent of the valve opening and simultaneously shifting the rocker arm in a longitudinal direction to adjust the position of the rocker arm in relation to the cam to vary the phase of the valve opening.

2. The method of claim 1, wherein the pivot shaft includes a first wheel engaged with the rocker arm, a second wheel engaged with a first stationary surface separate from the rocker arm, and a third wheel engaged with a second stationary surface separate from the rocker arm, the first wheel having a different diameter from the second wheel and third wheel so that the rolling of the pivot shaft causes the second wheel to roll along the first stationary surface and the third wheel to roll along the second stationary surface and the first wheel to roll along the rocker arm, thereby moving the rocker arm in relation to the first and second stationary surfaces.

3. The method of claim 2, wherein the first wheel is a first toothed cog which engages a toothed rack in the rocker arm, the second wheel is a second toothed cog which engages a first toothed rack in the first stationary surface and the third wheel is a third toothed cog which engages a second toothed rack on the second stationary surface.

4. The method of claim 2, wherein the step of moving the rocker arm in relation to the first and second stationary surfaces produces movement of said opposite end on the camshaft to vary the phase of the valve opening.

5. An apparatus for simultaneously varying the phase and extent of opening of a valve operable by a camshaft, comprising a rotatable camshaft having a cam thereon; a valve; a rocker arm having a first end riding on said camshaft over said cam and a second end engaged with said valve; a pivot shaft on which the rocker arm is pivotally engaged; and a stationary surface; the pivot shaft having a first wheel with a first diameter engaged with the rocker arm and a second wheel with a second diameter engaged with the stationary surface, wherein rotation of the pivot shaft results in movement of the pivot shaft along the stationary surface and the rocker arm and movement of the rocker arm in relation to the stationary surface and the camshaft to simultaneously vary to phase and extent of opening of the valve.

6. The apparatus of claim 5, wherein the movement of the pivot shaft along the stationary surface simultaneously varies the duration of the valve opening.

7. The apparatus of claim 6, wherein the first wheel is a first toothed cog and the rocker arm includes a rocker arm toothed rack engaged with the first toothed cog.

8. The apparatus of claim 7, wherein the second wheel is a second toothed cog and the stationary surface includes a stationary surface toothed rack engaged with the second toothed cog.

9. The apparatus of claim 8, wherein the pivot shaft further includes a third toothed cog and a second stationary surface including a second stationary surface toothed rack, the third toothed cog being engaged with said second stationary surface toothed rack, the second toothed cog and third toothed cog being of substantially the same diameter as one another, the first toothed cog being on the pivot shaft between the second toothed cog and third toothed cog, and the rocker arm toothed rack being between said two stationary surface toothed racks.

10. The apparatus of claim 9, further comprising a pivot shaft guide which guides the pivot shaft.

11. The apparatus of claim 10, wherein the pivot shaft guide includes a surface substantially perpendicular to the longitudinal axis of the pivot shaft and on a side of the pivot shaft opposite the rocker arm toothed rack along which the pivot shaft travels as it rolls along the toothed racks.

12. The apparatus of claim 11, further comprising a set of bearings to engage the pivot shaft with the pivot shaft guide.

\* \* \* \* \*